(12) United States Patent
Oka et al.

(10) Patent No.: US 10,599,136 B2
(45) Date of Patent: Mar. 24, 2020

(54) MOTOR CONTROLLER AND METHOD FOR CONTROLLING MOTOR

(71) Applicant: Kabushiki Kaisha Yaskawa Denki, Kitakyushu-shi (JP)

(72) Inventors: Yusuke Oka, Kitakyushu (JP); Tadashi Okubo, Kitakyushu (JP); Katsumi Ouchida, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 0 days.

(21) Appl. No.: 15/662,493

(22) Filed: Jul. 28, 2017

(65) Prior Publication Data
US 2018/0239344 A1    Aug. 23, 2018

(30) Foreign Application Priority Data

Feb. 20, 2017  (JP) ................................. 2017-029384

(51) Int. Cl.
| | |
|---|---|
| *G05B 21/02* | (2006.01) |
| *G05B 15/02* | (2006.01) |
| *G05D 3/12* | (2006.01) |
| *H02K 11/21* | (2016.01) |
| *G05B 19/402* | (2006.01) |

(52) U.S. Cl.
CPC ............. *G05B 21/02* (2013.01); *G05B 15/02* (2013.01); *G05D 3/127* (2013.01); *G05B 19/402* (2013.01); *G05B 2219/41141* (2013.01); *G05B 2219/41418* (2013.01); *H02K 11/21* (2016.01)

(58) Field of Classification Search
CPC ......... G05B 21/02; G05B 15/02; G05D 3/127
USPC ........................................................ 318/636
See application file for complete search history.

(56) References Cited

U.S. PATENT DOCUMENTS

| | | | | |
|---|---|---|---|---|
| 2015/0355607 A1* | 12/2015 | Nagaoka | ................ | G05B 19/19 318/561 |
| 2017/0012568 A1* | 1/2017 | Kiguchi | ................... | H02P 3/00 |

FOREIGN PATENT DOCUMENTS

JP          63-268006 A1    11/1988

* cited by examiner

*Primary Examiner* — Kawing Chan
*Assistant Examiner* — Bradley R Brown
(74) *Attorney, Agent, or Firm* — Oblon, McClelland, Maier & Neustadt, L.L.P.

(57) ABSTRACT

A motor controller includes memory, and processing circuitry that controls a motor based on a position command and based on a position detection value corresponding to a detected position of the motor, calculates a tolerance position error in a successive manner based on the position command and based on a control parameter used to control the motor, calculates a position error maximum threshold that depends on the tolerance position error, detects an abnormality based on the position error maximum threshold, and triggers an indication when the abnormality is detected.

14 Claims, 12 Drawing Sheets

MOTOR CONTROLLER AND METHOD FOR CONTROLLING MOTOR

CROSS-REFERENCE TO RELATED APPLICATIONS

The present application claims priority under 35 U.S.C. § 119 to Japanese Patent Application No. 2017-029384, filed Feb. 20, 2017. The contents of this application are incorporated herein by reference in their entirety.

BACKGROUND

Field of the Invention

The embodiments disclosed herein relate to a motor controller and a method for controlling a motor.

Discussion of the Background

Japanese Unexamined Patent Application No. 63-268006A1 discloses a technique directed to numerical control of a motor in which when there is a position error in excess of a fixed tolerance, an alarm is generated notifying the position error.

SUMMARY OF THE INVENTION

According to one aspect of the present disclosure, a motor controller includes memory, and processing circuitry that controls a motor based on a position command and based on a position detection value corresponding to a detected position of the motor, calculates a tolerance position error in a successive manner based on the position command and based on a control parameter used to control the motor, calculates a position error maximum threshold that depends on the tolerance position error, detects an abnormality based on the position error maximum threshold, and triggers an indication when the abnormality is detected.

According to another aspect of the present disclosure, a method for controlling a motor includes controlling the motor based on a position command and based on a position detection value corresponding to a detected position of the motor, calculating a tolerance position error in a successive manner based on the position command and based on a control parameter used in the controlling the motor, calculating a position error maximum threshold that depends on the tolerance position error, detecting an abnormality based on the position error maximum threshold, and triggering an indication when the abnormality is detected.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
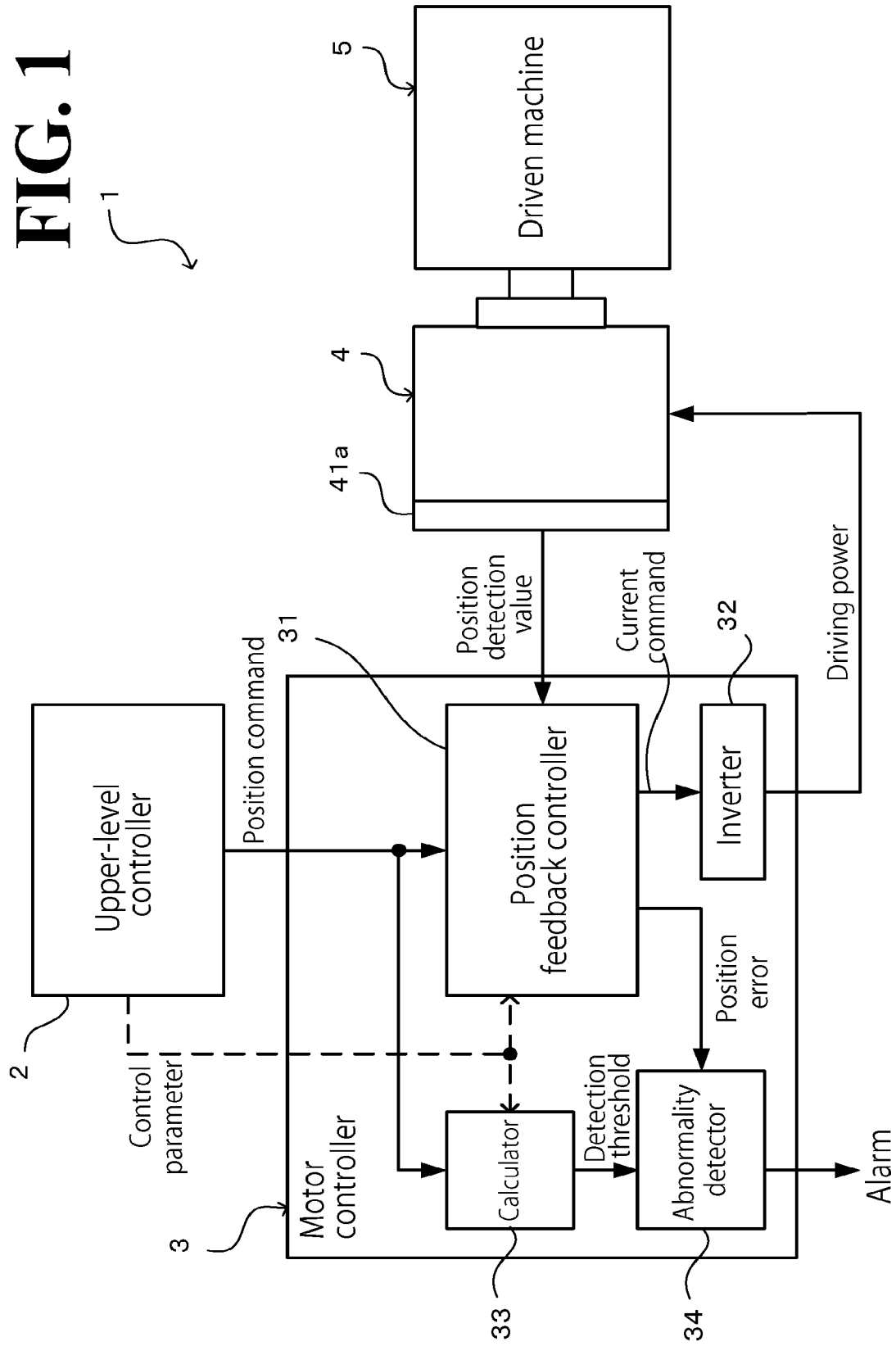
FIG. 1 is a diagram illustrating an exemplary system block configuration of a machine control system according to an embodiment.

The embodiments will now be described with reference to the accompanying drawings, wherein like reference numerals designate corresponding or identical elements throughout the various drawings.

Schematic Configuration of Machine Control System

FIG. 1 is a diagram illustrating an exemplary system block configuration of a machine control system 1 that includes a motor controller according to this embodiment. The machine control system controls a motor to drive to perform positioning control of the motor with respect to a movable portion of a driven machine. As illustrated in FIG. 1, the machine control system 1 includes an upper-level controller 2, a motor controller 3, a motor 4, and a driven machine 5.

A non-limiting example of the upper-level controller 2 is a general-purpose personal computer that includes, for example, a CPU, a ROM, a RAM, an operation section, and a display section, all of which are not illustrated. In response to various kinds of setting and commands input by an operator through the operation section, the upper-level controller 2 generates a position command for positioning with respect to the movable portion of the driven machine 5, described later. Then, the upper-level controller 2 inputs the position command into the motor controller 3.

The motor controller 3 generates driving power based on the position command input from the upper-level controller 2, and inputs the driving power into the motor 4. At the same time, the motor controller 3 performs position feedback control based on a position detection value output from an encoder 41a, described later, of the motor 4. The motor controller 3 includes a position feedback controller 31, an inverter 32, a calculator 33, and an abnormality detector 34.

The position feedback controller 31 (position controller) generates a current command based on the above-described position command and the above-described position detection value. This processing at the position feedback controller 31 is performed using control parameters such as position loop gain $K_P$, described later. In this embodiment, the upper-level controller 2 inputs the control parameters into the position feedback controller 31. The same control parameters are set in the position feedback controller 31 and the calculator 33, described later. The control parameters may be input into the position feedback controller 31 using an engineering tool, not illustrated. The processing at the position feedback controller 31 will be described in detail later by referring to control blocks illustrated in FIG. 2.

The inverter 32 performs pulse width modulation (PWM) control and other control based on the current command output from the position feedback controller 31 so as to convert external, commercial power, not illustrated, into driving power to be supplied to the motor 4.

The calculator 33 calculates a detection threshold based on the position command output from the upper-level controller 2. Details of the calculation at the calculator 33 to obtain the detection threshold will be provided later.

The abnormality detector 34 compares the detection threshold calculated by the calculator 33 with a position error calculated in the position feedback controller 31, and uses the result of the comparison for determining whether there is an abnormality in the motor 4 and the driven machine 5. When the abnormality detector 34 has determined that there is an abnormality, the abnormality detector 34 outputs an alarm signal to notify occurrence of the abnormality. The alarm signal may be output from a display device or input into the upper-level controller 2.

A non-limiting example of the motor 4 is a synchronization-rotary three-phase alternating-current (AC) motor. The motor 4 includes the encoder 41a. The encoder 41a is integral to the motor 4 and outputs the rotation angle of the output shaft of the motor 4 as a position detection value. Other examples of the motor 4 include, but are not limited to, an induction motor and a linear motor.

The driven machine 5 is connected to the output shaft of the motor 4 and drivable by the motor 4. The driven machine 5 has a movable portion drivable based on the rotation angle of the output shaft of the motor 4.

Feedback Control System in Relation to Other Elements

Figure 2:
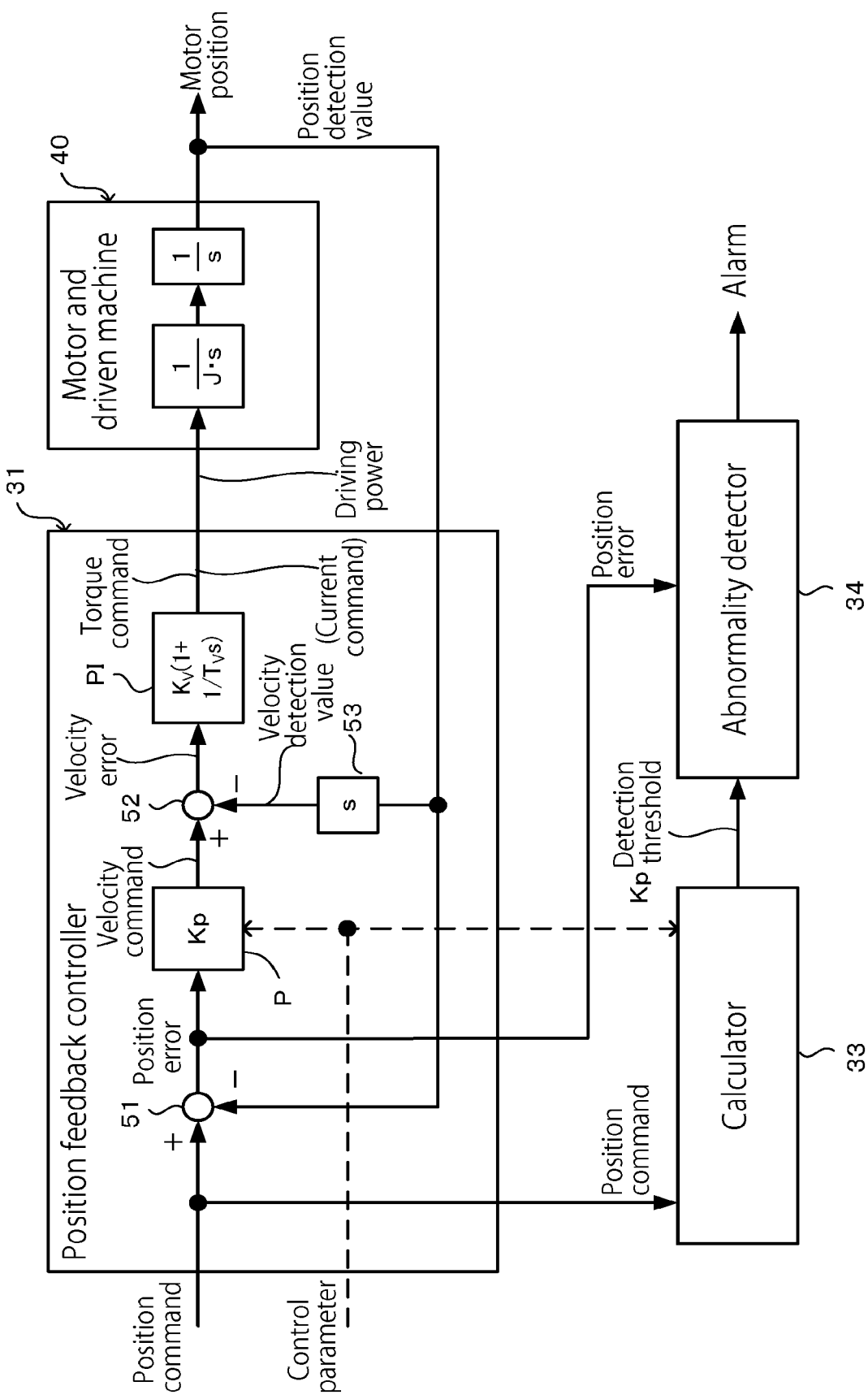
FIG. 2 is a diagram of a feedback control system, which includes a feedback controller, illustrating how various kinds of information are sent to and from a calculator and an abnormality detector.

FIG. 2 is a diagram of a feedback control system, which includes the position feedback controller 31, illustrating how various kinds of information are sent to and from the calculator 33 and the abnormality detector 34. As used herein, the feedback control system is implemented by the position feedback controller 31 and a combination of its control targets, namely, the motor 4 and the driven machine 5 (which will be hereinafter occasionally referred to as motor and driven machine). These elements are mathematically modeled in transfer function blocks. FIG. 2 illustrates the position feedback controller 31, a motor and driven machine 40, the calculator 33, and the abnormality detector 34.

The position feedback controller 31 includes a subtractor 51, a position proportional controller P, a subtractor 52, a velocity proportional integration controller PI, and a velocity operator 53.

The subtractor 51 receives a position command from outside the position feedback controller 31, and receives the value of a detection position detected at the motor and driven machine 40. Then, the subtractor 51 subtracts the detection position value from the position command and outputs the resulting position error. The position proportional controller P multiplies the position error by the position loop gain $K_P$ and outputs the product as a velocity command. In this embodiment, the value of the position loop gain $K_P$ is a fixed control parameter input from the upper-level controller 2.

The subtractor 52 receives a velocity detection value from the velocity operator 53, described later, and subtracts the velocity detection value from the velocity command. Then, the subtractor 52 outputs the resulting velocity error. The velocity proportional integration controller PI multiplies the velocity error by velocity loop gain $K_V$ and velocity integration constant $T_V$ (for example, multiplies the velocity error by $K_V(1+1/T_V s)$), and outputs the product as a torque command. For simplicity of illustration, the inverter 32 is not illustrated in FIG. 2; that is, a current command corresponding to the torque command is directly input as driving power into the motor and driven machine 40.

The velocity operator 53 outputs a velocity detection value (output velocity of the motor 4) based on the position detection value (motor position) detected at the motor and driven machine 40. In this embodiment, the velocity operator 53 is implemented by a differentiator s.

The motor and driven machine 40 corresponds to the motor 4 and the driven machine 5 illustrated in FIG. 1, and is mathematically modeled based on the inertia moment, J, of the entire movable mechanism implemented by connecting the rotor of the motor 4 with the movable portion of the driven machine 5.

Thus, the feedback control system according to this embodiment is implemented by the position feedback controller 31 and the motor and driven machine 40, and has a double loop configuration (what is called P-PI control configuration) implemented by the feedback loop of the position proportional control system and the feedback loop of the velocity proportional integration control system. It is also possible to use a position proportional integration control system.

The calculator 33 uses the position command and the position loop gain $K_P$ input into the position feedback controller 31 to calculate a detection threshold, and inputs the detection threshold into the abnormality detector 34. The abnormality detector 34 compares the detection threshold with the position error output from the subtractor 51 of the position feedback controller 31 to determine whether there is an abnormality in the motor and driven machine 40. When the abnormality detector 34 has determined that there is an abnormality, the abnormality detector 34 outputs an alarm signal.

In the machine control system 1 with the above-described configuration, the motor controller 3 performs position feedback control, which is to control the driving power supplied to the motor 4 so as to cause the position detection value output from the encoder 41a to follow the position command. At the same time, when the motor controller 3 has detected an abnormality in the motor 4 and the driven machine 5, the motor controller 3 outputs an alarm signal.

Non-Limiting Features of this Embodiment

As in the above-described embodiment, typical position control performed with respect to a motor is to generate a velocity command or a torque command (current command) based on the position error between a position command and the detection value of the position of the motor, and to perform position feedback control with respect to the motor based on the command.

Such position feedback control is in some cases equipped with a function that, when the position error is equivalent to or greater than a predetermined threshold, determines that the position error is excessively large and that there is some abnormality in the control target including the motor. In this respect, the position error is prone to increasing as the position command velocity (which is the rate of change in time of the position command, described later) increases. In view of this situation, conventional practice is to fix the above-described threshold at a comparatively high value corresponding to a maximum velocity (maximum position command velocity) in a command pattern.

When the position command velocity is relatively low, however, it takes more time for the position error to increase, and if in the meantime an abnormality occurs disabling the motor 4 to operate, the detection of the abnormality might be delayed, since it takes more time for the position error to increase and exceed the threshold fixed at a comparatively high value.

In view of this situation, this embodiment includes the calculator 33. The calculator 33 calculates a tolerance position error (described later) in a successive manner based on the position command and based on the position loop gain $K_P$, which is a control parameter used at the position feedback controller 31. Then, the calculator 33 calculates a detection threshold that depends on the change in time of the tolerance position error. The tolerance position error is a theoretical position error that is predicted to occur due to change in time of the position command. The tolerance position error is also a value that changes in time, and the calculator 33 uses the tolerance position error as a basis for calculating a detection threshold that depends on the tolerance position error; that is, the detection threshold changes every time the tolerance position error changes. This configuration takes into consideration the change in time of the position command and the predicted position error, and ensures that an optimum detection threshold for each change is set. This configuration enables this embodiment to deal with any control situations, providing greater flexibility in detecting an abnormality as compared with the case of a fixed detection threshold. How to detect an abnormality will be detailed below.

How to Calculate Detection Threshold

Figure 3:
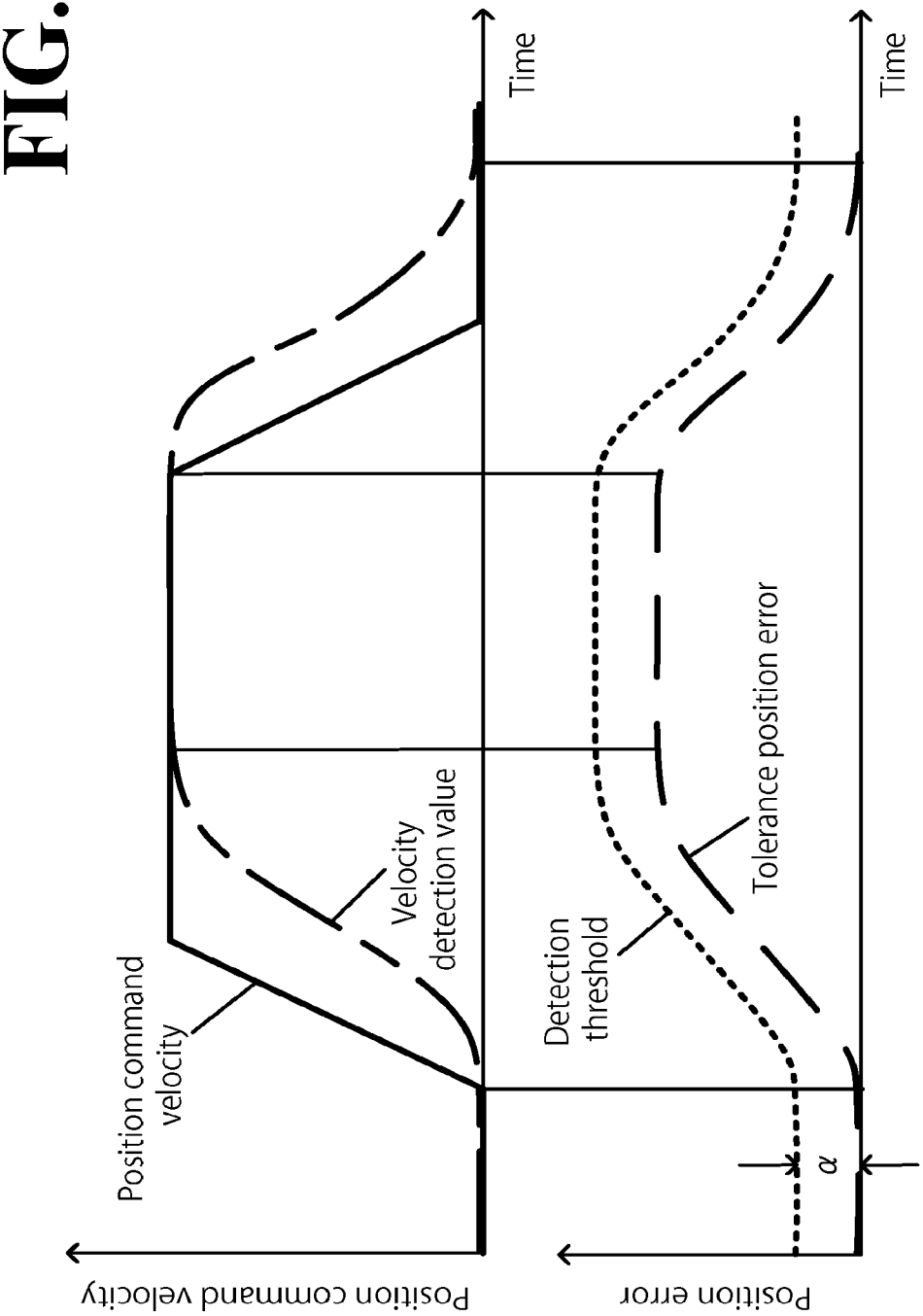
FIG. 3 illustrates time charts of position command velocity, position detection value, detection threshold, and tolerance position error plotted over time in a case where inching positioning control is performed.

FIG. 3 illustrates a time chart (upper time chart) of the position command velocity and the position detection value plotted over time in a case where the motor position undergoes positioning control, and a time chart (lower time chart) of the detection threshold and the tolerance position error plotted over time.

When the feedback control system undergoes positioning control, the position command velocity, which is the rate of change in time of the position command, changes over time in an approximately trapezoidal pattern as represented by the solid curve in the upper time chart of FIG. 3. Specifically, during acceleration at the start of motion, the position command velocity linearly increases; during uniform motion, the position command velocity is constant; and during deceleration, the position command velocity linearly decreases. The velocity actually output from the motor 4, that is, the velocity detection value output from the velocity operator 53 changes over time in a nonlinear pattern that, while approximating the approximately trapezoid pattern of the position command velocity, slightly lags behind the approximately trapezoid pattern in time and that has curved corners. The nonlinear pattern is represented by the dashed curve in the upper time chart of FIG. 3.

The difference of how the position command velocity and the velocity detection value change over time causes the position error to occur between the position command and the position detection value. At normal time, the change in time of the pattern of the position error can be predicted using a predetermined operation that is based on the position command velocity and the position loop gain $K_P$. In this embodiment, the position error theoretically predicted to occur is regarded as tolerance position error, and the pattern of change in time of the tolerance position error is also an approximately trapezoidal pattern as represented by the broken curve in the lower time chart of FIG. 3. Specifically, after the position command velocity starts increasing, the tolerance position error nonlinearly increases; for the period of time when the position command velocity and the velocity detection value are the same, the tolerance position error is constant; and after the position command velocity starts decreasing, the tolerance position error nonlinearly decreases.

Figure 4:
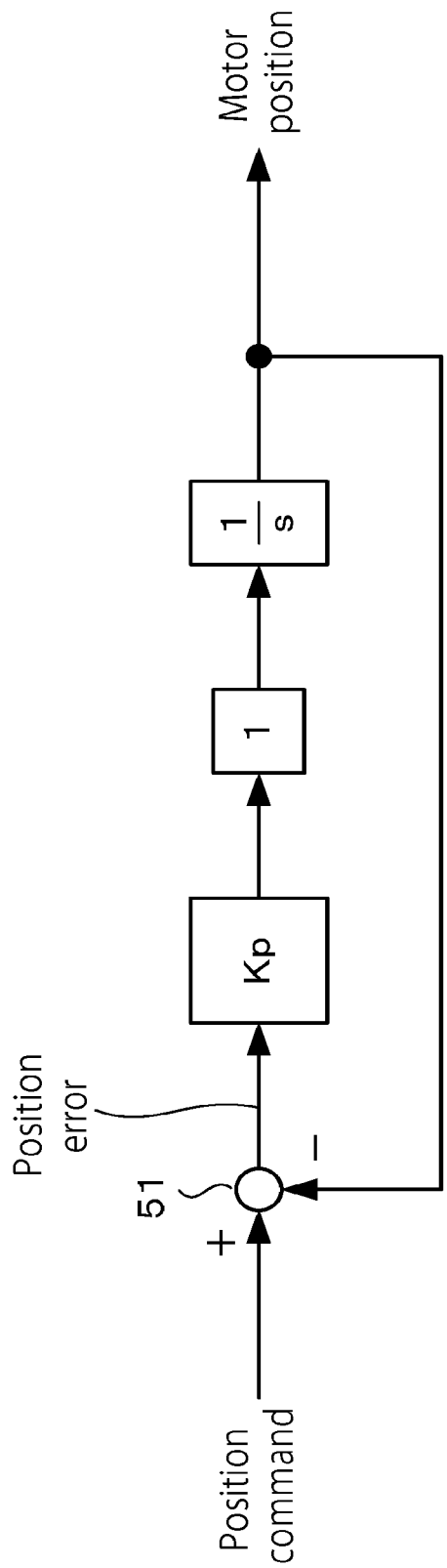
FIG. 4 is a control block diagram illustrating in simplified form a position control system feedback loop included in the control blocks illustrated in FIG. 2.

Non-limiting operation formulae used to calculate the tolerance position error will be described below. First, this embodiment is concerning the detection of an abnormality based on the change of the position error. In this respect, the influence that the velocity control system feedback loop has on the position error is negligibly low. Therefore, the velocity control system feedback loop can be removed from the feedback control system illustrated in FIG. 2, resulting in the control blocks of the position control system feedback loop alone as illustrated in FIG. 4. For simplicity of calculation, the velocity loop gain $K_V$ and the velocity integration constant $T_V$ are substituted with "1" (more specifically, the velocity proportional integration controller PI=$K_V(1+1/T_V s)$ is substituted with "1"), and the velocity operator 53, the inertia moment J, and the integrator (1/s) are omitted. The control blocks illustrated in FIG. 4 can be modified to the control blocks illustrated in FIG. 5, where the position error is output from the position command.

Figure 5:
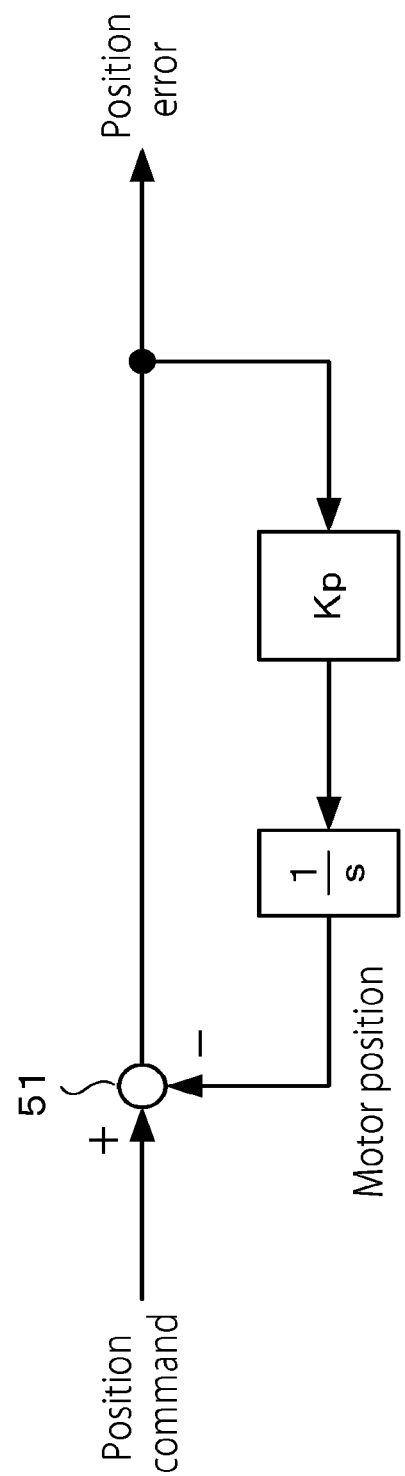
FIG. 5 is a control block diagram illustrating in modified form the control blocks illustrated in FIG. 4 with position error output from position command.

From the control blocks illustrated in FIG. 5, a transfer function from the position command to the position error can be represented as follows:

$$G_\varepsilon(s) = \frac{1}{1+\frac{K_P}{s}} = \frac{s}{s+K_P}$$

In this respect, in the uniform motion section, where the position command velocity and the velocity detection value are the same, that is, in the section where the tolerance position error is constant, the tolerance position error can be represented as follows:

$$E_P(s) = G_\varepsilon(s) \times X_{ref}(s) = \frac{F}{s^2}\frac{s}{s+K_P}$$

In this formula, F is the position command velocity, and $X_{ref}(s)$ $(=F/s^2)$ is the position command.

Then, based on the final value theorem, the position error in steady state (steady-state error) can be represented as follows:

$$\varepsilon(\infty) = \lim_{s \to 0} sE_P(s) = \lim_{s \to 0} \frac{F}{s+K_P} = \frac{F}{K_P}$$

From the above-described formulae, the tolerance position error, $\varepsilon$, at each point of time can be approximated to the quotient obtained by dividing the instantaneous value of the position command velocity F at the point of time by the position loop gain $K_P$. Thus, the pattern of the time waveform of the tolerance position error illustrated in FIG. 3 can be regarded as being approximately equivalent to an approximately trapezoidal time change pattern of the position command velocity having a height multiplied by 1/K$_P$.

When in the positioning control the rotation direction of the motor 4 is opposite to the direction exemplified in the drawings, each of the time change patterns of the position command velocity, the velocity detection value, and the tolerance position error is upside down so that the original time change pattern and its upside-down version establish a symmetry about the time axis (not illustrated).

In this embodiment, the calculator 33 calculates the detection threshold by adding a detection level value α, which has a predetermined quantity, to an instantaneous value of the calculated tolerance position error in the direction of the position command velocity. Specifically, based on the input position command, the calculator 33 calculates the position command velocity F at this point of time. Then, based on the position command velocity F, the calculator 33 calculates the detection threshold, L$_{TH}$, as follows:

$$L_{TH} = \frac{F}{K_P} + \alpha$$

Specifically, based on the position command F and the position loop gain K$_P$, the calculator 33 calculates the tolerance position error s in a successive manner, thereby causing the tolerance position error s to change in time. Then, the calculator 33 calculates a detection threshold L$_{TH}$ that depends on the tolerance position error ε changing in time. The detection threshold L$_{TH}$ is a non-limiting example of the position error maximum threshold recited in the appended claims.

The time waveform pattern of the detection threshold L$_{TH}$ is represented by the dotted curve in the lower time chart of FIG. 3. Specifically, if the time change pattern (broken curve) of the tolerance position error is offset upward by the detection level value α, the time waveform pattern of the detection threshold L$_{TH}$ results.

The detection level value α is any time a positive value and is added to an instantaneous value of the tolerance position error in the direction of the position command velocity, as described above. When the rotation direction of the motor 4 is reversed, the detection threshold L$_{TH}$ is represented as follows:

$$L_{TH} = \frac{F}{K_P} - \alpha$$

In this case, the time change pattern of the detection threshold L$_{TH}$ is such that the time change pattern of the tolerance position error is offset downward by the detection level value α (not illustrated).

When the actual position error input into the abnormality detector 34 from the subtractor 51 exceeds the detection threshold L$_{TH}$, that is, when the absolute value of the actual position error becomes greater than the absolute value of the detection threshold L$_{TH}$, the abnormality detector 34 outputs an alarm signal notifying that there is an abnormality in the motor 4 or the driven machine 5. In this respect, assume that at normal time the pattern of change in time of the actual position error is approximately the same as the pattern of change in time of a theoretical tolerance position error. In this case, if the actual position error increases by the detection level value α due to the abnormality in the motor 4 or the driven machine 5, the abnormality is immediately detected. In view of this, by minimizing the detection level value α, responsiveness to abnormalities improves.

Non-Limiting Advantageous Effects of this Embodiment

In the machine control system 1 according to this embodiment, the motor controller 3 includes the calculator 33. The calculator 33 calculates a tolerance position error in a successive manner based on the position command and based on the position loop gain K$_P$ (control parameter), which is used at the position feedback controller 31. Then, the calculator 33 calculates a detection threshold that depends on the change in time of the tolerance position error. The tolerance position error is a theoretical position error that is predicted to occur due to change in time of the position command (position command velocity). The tolerance position error is also a value that changes in time, and the calculator 33 uses the tolerance position error as a basis for calculating a detection threshold that depends on the tolerance position error; that is, the detection threshold changes every time the tolerance position error changes. This configuration takes into consideration the change in time of the position command and the predicted position error, and ensures that an optimum detection threshold for each change is set. This configuration enables this embodiment to deal with any control situations, providing greater flexibility in detecting an abnormality as compared with the case of a fixed detection threshold. As a result, the ability of the motor controller 3 to detect an abnormality improves.

Also in this embodiment, the calculator 33 calculates the detection threshold by adding (offsetting) the detection level value α, which has a predetermined quantity, to the tolerance position error ε in the direction of the position command velocity F, which is the rate of change in time of the position command. This configuration ensures that the absolute value of the detection threshold L$_{TH}$ is kept at values that are greater by the detection level value α, which has a predetermined fixed quantity, than theoretical variables of the tolerance position error s that are predicted to occur in normal driving. This configuration, in turn, enables the assumption to be made that an abnormality has occurred from the fact that the absolute value of the actual position error has increased by the detection level value α beyond the tolerance position error E. As a result, responsiveness to abnormalities improves.

Also in this embodiment, the control parameters include the position loop gain K$_P$, which is used at the position feedback controller 31. The position loop gain K$_P$ greatly affects the occurrence of the position error. By including the position loop gain K$_P$ in the control parameters, the calculator 33 is able to take into consideration the position loop gain K$_P$ in calculating the tolerance position error s and the detection threshold L$_{TH}$ at the position feedback controller 31, thereby making the tolerance position error ε and the detection threshold L$_{TH}$ more specific and more functional. As a result, the ability of the motor controller 3 to detect an abnormality improves.

Also in this embodiment, the abnormality detector 34 detects an abnormality by comparing the detection threshold with the position error, which is the difference between the position command and the position detection value. This configuration enables the abnormality detector 34 to more specifically and more functionally detect an abnormality based on the actual position error and the detection threshold calculated by the calculator 33.

Modifications

Modifications will be described below.

Modification 1: Position Feedforward Control Included

Figure 6:
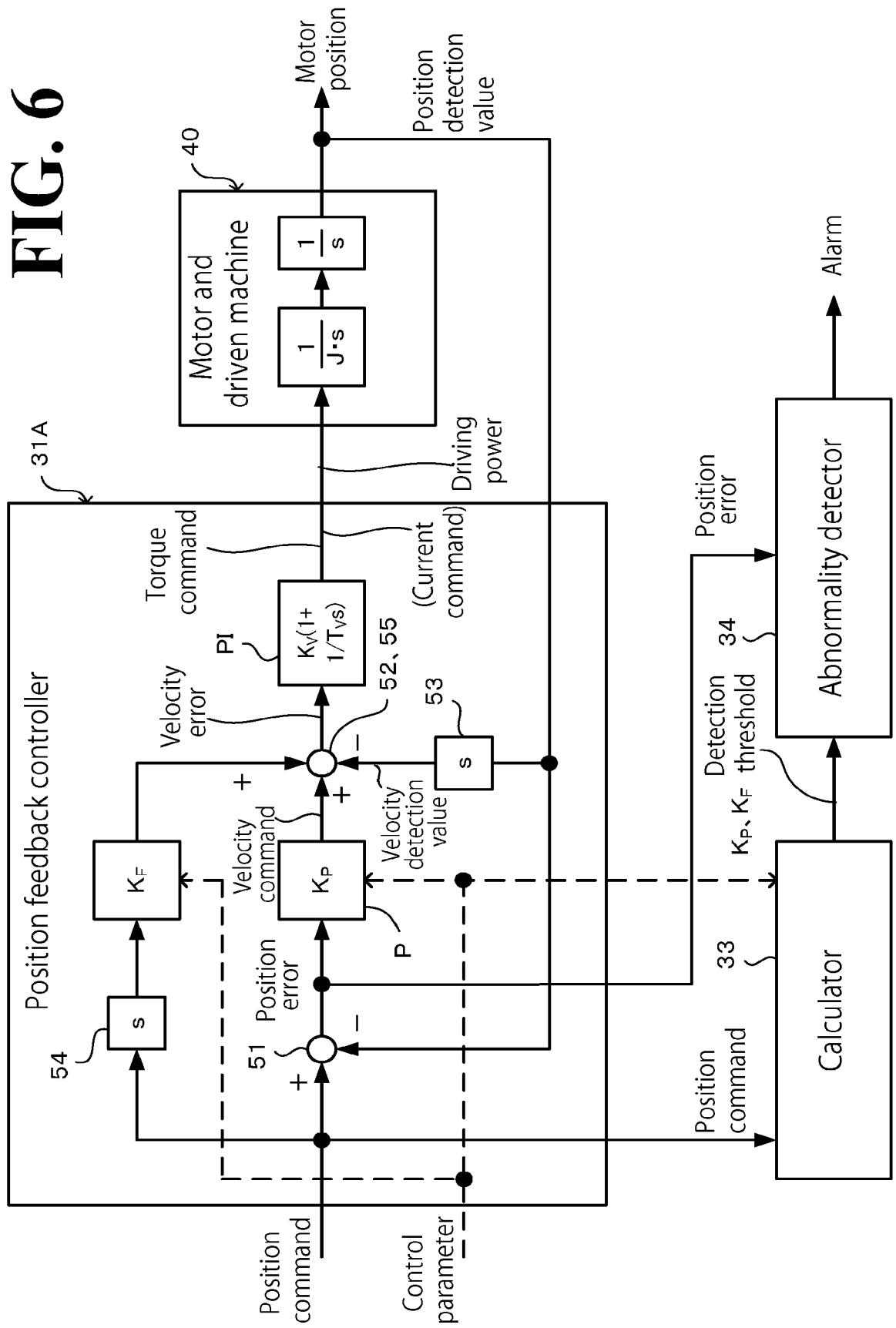
FIG. 6 is a control block diagram illustrating a position feedback controller that performs position feedforward control as well as position feedback control.

FIG. 6 is a control block diagram illustrating a position feedback controller 31A, which performs position feedforward control as well as the position feedback control. Referring to FIG. 6, the position feedback controller 31A includes, in addition to the elements illustrated in FIG. 2, a differentiator 54, a position feedforward gain $K_F$, and an adder 55. The differentiator 54 differentiates the position command. The position feedforward gain $K_F$ is multiplied by the output of the differentiator 54. The adder 55 adds the product obtained at the position feedforward gain $K_F$ to the product obtained at the position loop gain $K_P$ (in FIG. 6, the adder 55 is integral to the subtractor 52). The position feedforward gain $K_F$ input into the position feedback controller 31A is also input into the calculator 33 as a control parameter. When the position feedforward control is performed as well as the position feedback control, as in the modification of FIG. 6, it is the control path that greatly affects the occurrence of the actual position error. In view of this, the calculator 33 preferably calculates a detection threshold that depends on the control path.

Figure 7:
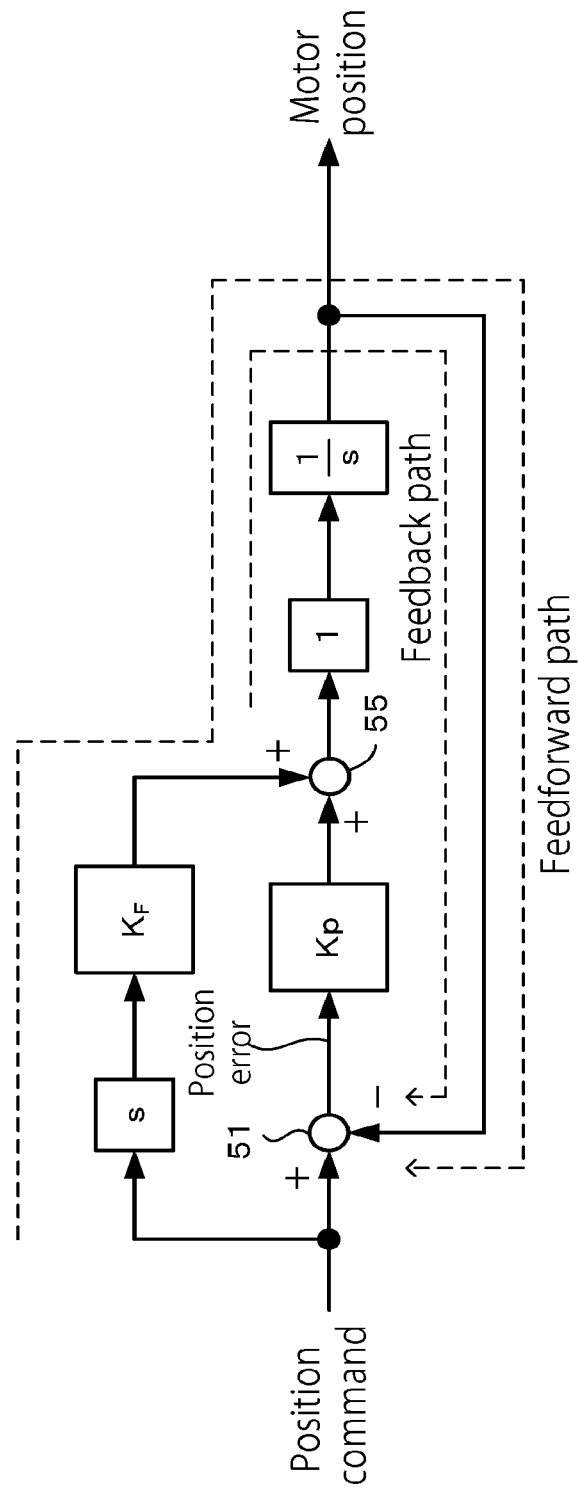
FIG. 7 is a control block diagram illustrating in simplified form a position control system feedback loop included in the control blocks illustrated in FIG. 6 together with the position feedforward control.

FIG. 7 is a control block diagram illustrating a position control system feedback loop in the control blocks illustrated in FIG. 6 together with the control path of the position feedforward control. FIG. 7 is similar to FIG. 4 in that the velocity control system feedback loop is omitted. Referring to FIG. 7, the path to a position immediately before the subtractor 51 starting from the differentiator s and passing through the position feedforward gain $K_F$, the adder 55, and the integrator 1/s is what is called a feedforward path. The path to a position immediately before the subtractor 51 starting from a position immediately beyond the adder 55 and passing through the integrator 1/s is what is called a feedback path.

Figure 8:
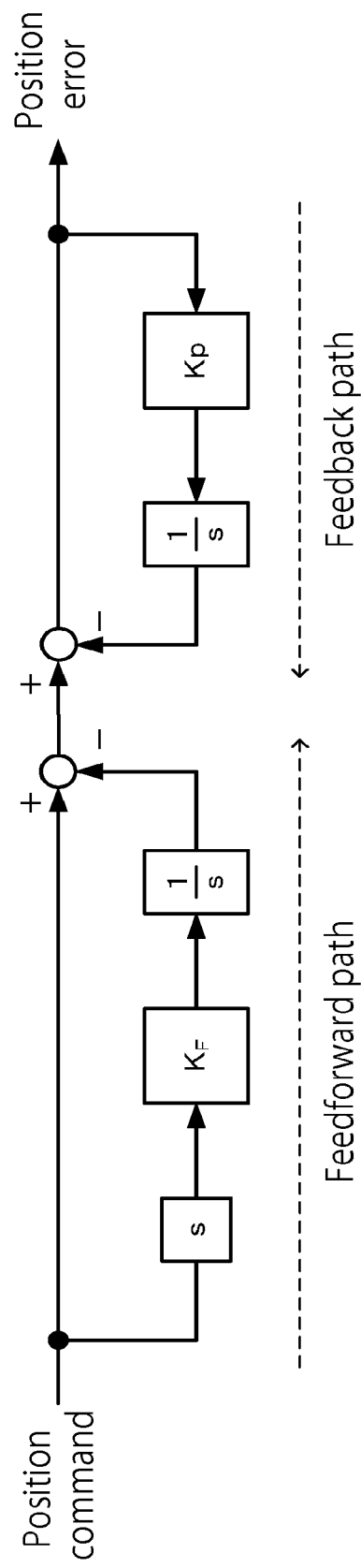
FIG. 8 is a diagram illustrating in modified form the control blocks illustrated in FIG. 7 with position error output from position command.
Figure 9:
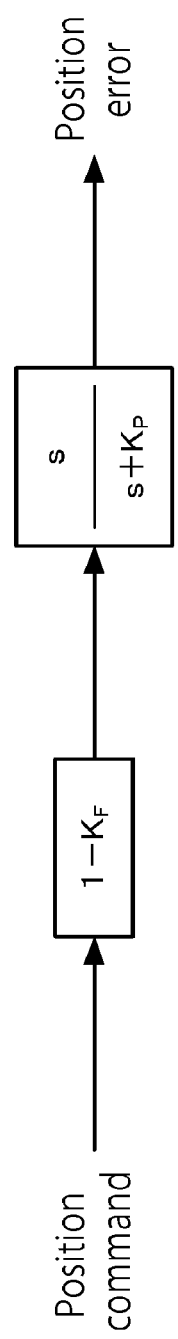
FIG. 9 is a diagram illustrating the control blocks illustrated in FIG. 8 modified in simplified form.

The control blocks illustrated in FIG. 7 can be modified to the control blocks illustrated in FIG. 8, where the position error is output from the position command. Referring to FIG. 8, the path to the integrator 1/s starting from the differentiator s and passing through the position feedforward gain $K_F$ is the feedforward path. The path to the integrator 1/s starting from the position loop gain $K_P$ is the feedback path. FIG. 8 can be further modified in simplified form as illustrated in FIG. 9.

From the control blocks illustrated in FIG. 9, a transfer function from the position command to the position error can be represented as follows:

$$G(s) = (sK_F + K_P)\frac{\frac{1}{s}}{1 + \frac{K_P}{s}} = \frac{sK_F + K_P}{s + K_P}$$

In this respect, the tolerance position error in the uniform motion section can be represented as follows:

$$E(s) = \frac{(1 - K_F)s}{s + K_P} X_{ref}(s)$$

Then, based on the final value theorem, the position error in steady state (steady-state error) can be represented as follows:

$$\varepsilon(\infty) = \lim_{s \to 0} sE(s) = \lim_{s \to 0} \frac{(1 - K_F)F}{s + K_P} = \frac{F}{\frac{K_P}{1 - K_F}} = \frac{F}{K_P'}$$

From the above-described formulae, the tolerance position error s according to this modification can be approximated to the quotient obtained by dividing the instantaneous value of the position command velocity F at the present point of time by $K_P'$ $(=K_P/(1-K_F))$. Based on the tolerance position error s thus obtained, the calculator 33 calculates the detection threshold $L_{TH}$ as follows:

$$L_{TH} = \frac{F}{K_P'} + \alpha$$

Thus, the control parameters according to this modification include the position feedforward gain $K_F$. The position feedforward gain $K_F$ greatly affects the occurrence of the position error. By including the position feedforward gain $K_F$ in the control parameters, the calculator 33 is able to take into consideration the position feedforward gain $K_F$ as well as the position loop gain $K_P$ in calculating the tolerance position error c and the detection threshold $L_{TH}$ at the position feedback controller 31A, thereby making the tolerance position error s and the detection threshold $L_{TH}$ more specific and more functional. As a result, the ability of the motor controller 3 to detect an abnormality improves.

Modification 2: Actual Position Error Lags Behind Tolerance Position Error

Figure 10:
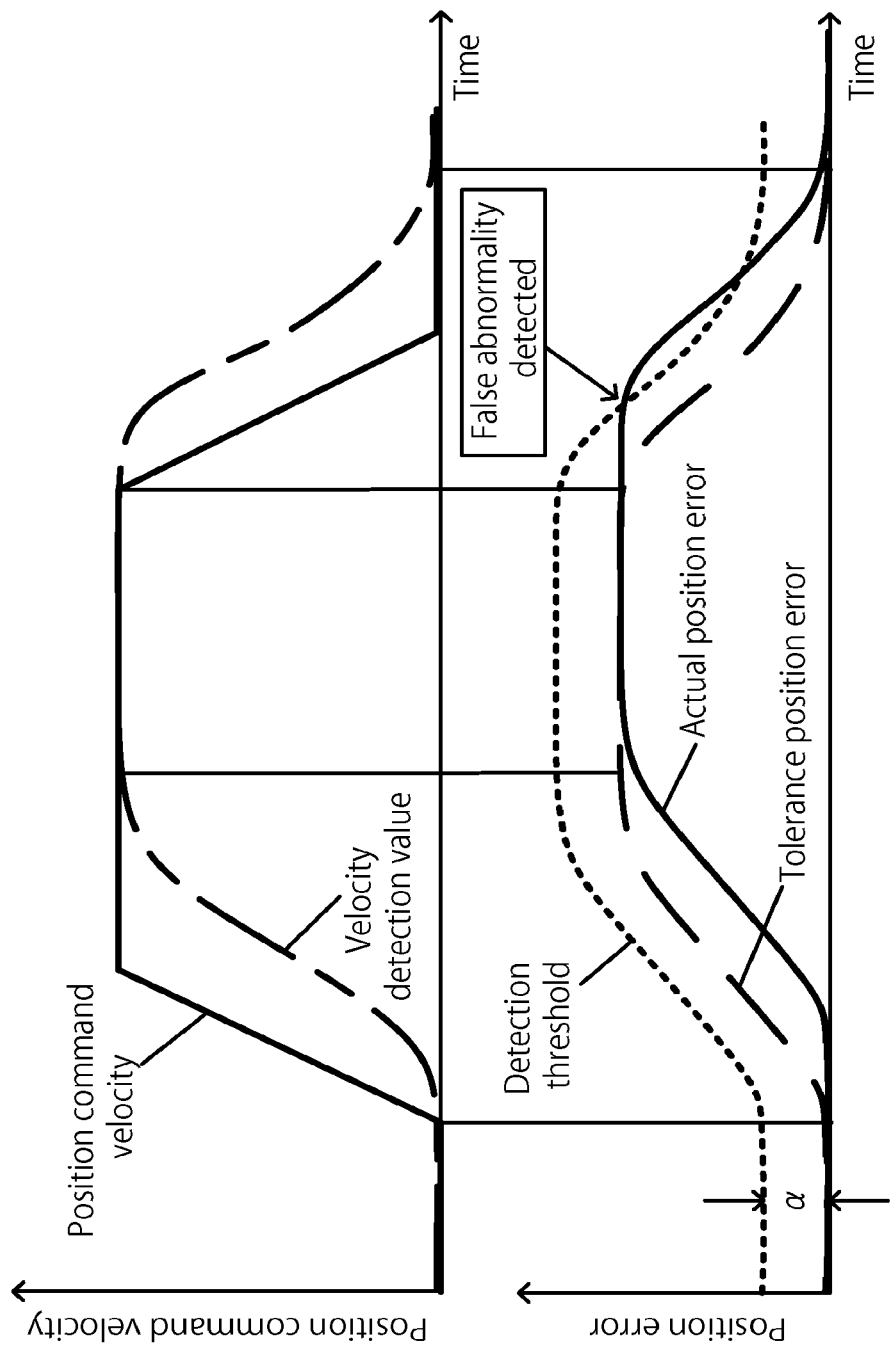
FIG. 10 illustrates time charts for comparison with FIG. 3 where the time change pattern of actual position error lags behind tolerance position error.

FIG. 10 illustrates a more realistic behavior observed in the position feedback control than the behavior observed in FIG. 3. Specifically, the actual position error often changes in time while drawing a pattern (the solid curve in the lower time chart of FIG. 10) that lags behind the pattern of the theoretical tolerance position error due to a control delay, load situations, and/or defective setting of the velocity loop gain $K_V$. This might cause the comparison between the detection threshold calculated by the calculator 33 and the actual position error to indicate that the position error exceeds the detection threshold during decrease of the position command velocity even when there is no abnormality. Thus, it is possible for a false abnormality to be detected.

Figure 11:
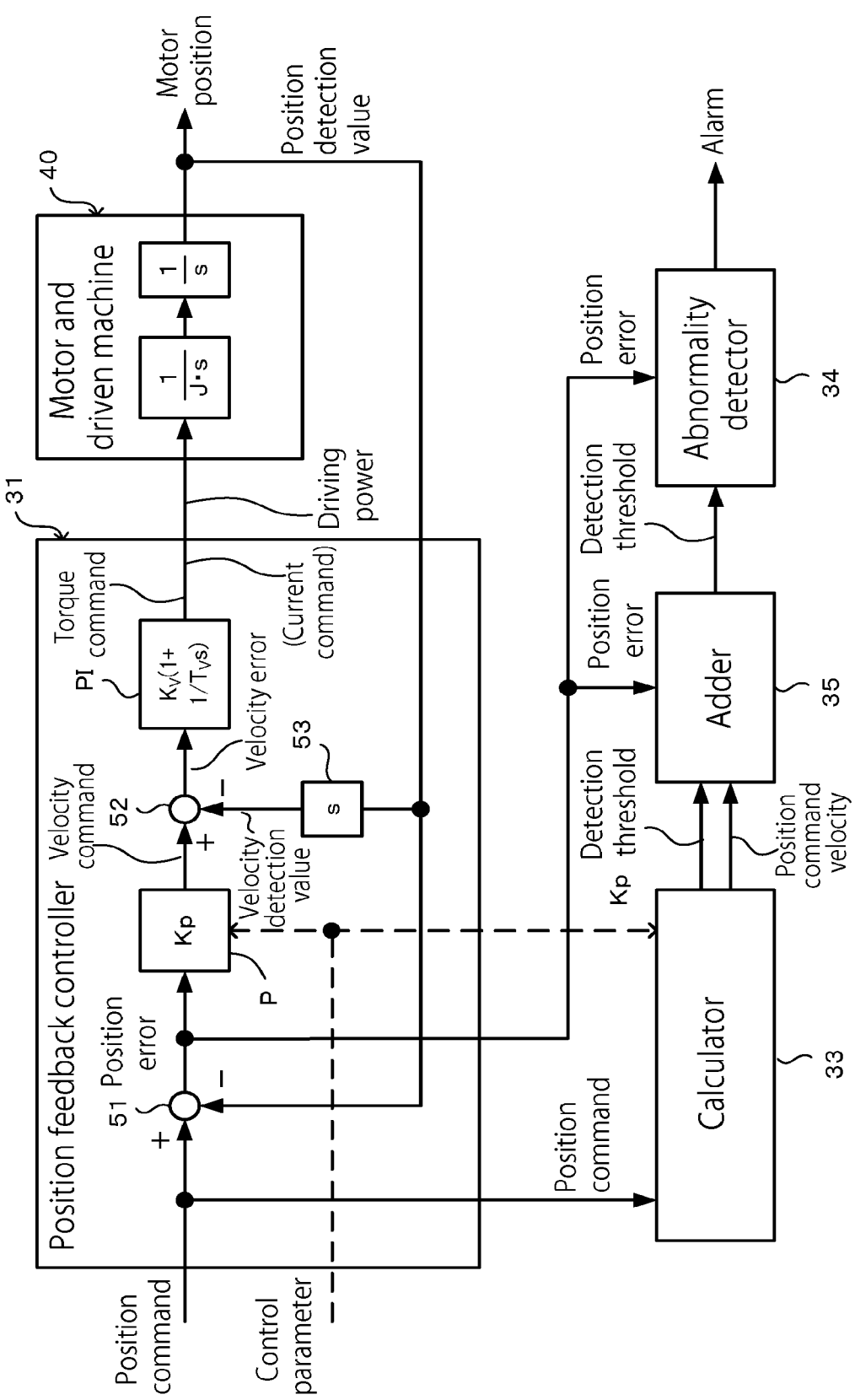
FIG. 11 is a control block diagram with a fixer.

In contrast, the motor controller 3 according to this modification eliminates or minimizes detection of a false abnormality by fixing the detection threshold at a predetermined timing. FIG. 11 is a control block diagram with a fixer that fixes the detection threshold being added to the control block diagram of FIG. 2. Referring to FIG. 11, the calculator 33 outputs the position command velocity as well as the detection threshold to a fixer 35. At normal time, the fixer 35 outputs the input detection threshold to the abnormality detector 34 without making any changes to the detection threshold. At a predetermined timing that is based on change of the input position command velocity, the fixer 35 fixes the detection threshold to the present value (the value at this point of time), and outputs the fixed detection threshold.

The fixer 35 also receives a position error (actual position error output from the subtractor 51) occurring in the position feedback controller 31. At a predetermined timing that is based on change of the position error, the fixer 35 stops fixing the detection threshold, outputting the detection threshold input from the calculator 33 to the abnormality detector 34 without making any changes to the detection threshold.

Figure 12:
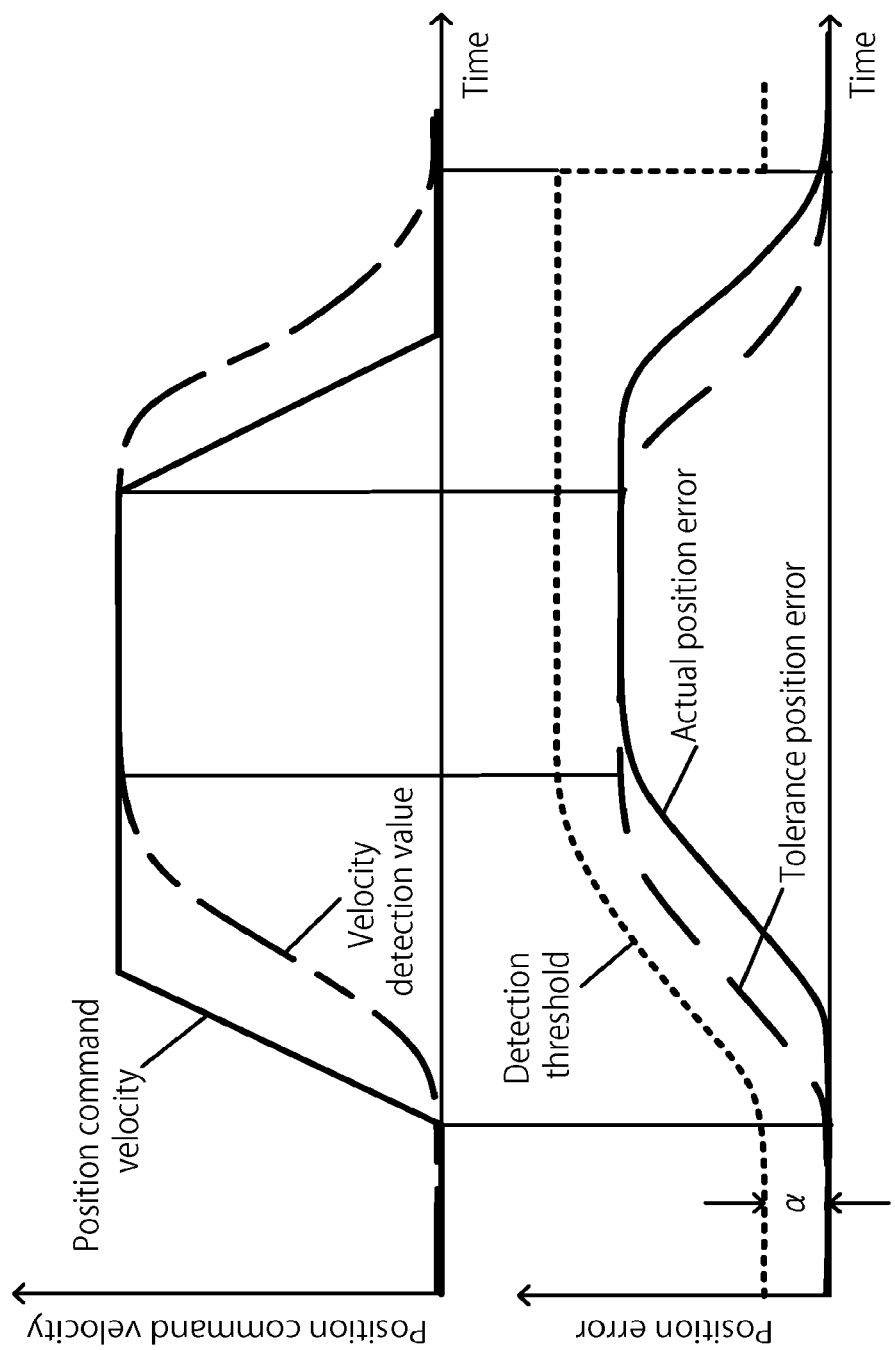
FIG. 12 illustrates time charts for comparison with FIG. 10 with a fixed detection threshold fixed at the fixer.

FIG. 12 illustrates time charts including a time change pattern of the detection threshold input into the abnormality detector 34 in a case where the fixer 35 starts fixing the detection threshold at the timing of start of decrease of the position command velocity and the fixer 35 stops fixing the detection threshold at the timing when the position error becomes approximately zero (see the dotted curve in the lower time chart of FIG. 12). As the dotted curve indicates, the detection threshold is fixed at its maximum value while the position command velocity is on the decrease. This configuration prevents the actual position error from exceeding the detection threshold, eliminating or minimizing detection of a false abnormality.

As has been described hereinbefore, the machine control system 1 according to this modification includes the fixer 35. The fixer 35 fixes the detection threshold at a predetermined timing. This configuration minimizes the possibility of the position error exceeding the detection threshold even when the time change pattern of the actual position error lags behind the time change pattern of the tolerance position error. That is, this configuration eliminates or minimizes detection of a false abnormality.

Also in this modification, the fixer 35 starts fixing the detection threshold at the timing when the position command velocity starts decreasing. The detection of a false abnormality caused by a delay of the time change pattern of the position error often occurs while the position command velocity is on the decrease. In view of this situation, the fixer 35 fixes the detection threshold at the timing when the position command velocity starts decreasing so as to eliminate or minimize detection of a false abnormality while the position command velocity is on the decrease.

Also in this modification, the fixer 35 fixes the detection threshold at its present value. This configuration ensures that the position error does not exceed the detection threshold for the mere reason that the time change pattern of the position error is delayed. As a result, this configuration eliminates or minimizes detection of a false abnormality.

Also in this modification, the fixer 35 stops fixing the detection threshold at the point of time when the positioning of the motor 4 is completed. The point of time when the positioning of the motor 4 is completed is not intended as the point of time when the position command velocity is zero, but is intended as the point of time when the motor stops and its position is determined (this intension is for the purpose of taking into consideration vibration causing an overshoot when the motor stops). At this point of time, a stable state is established where the detection value of the position of the motor 4 stops fluctuating and matches the position command; that is, the position error becomes zero. At the point of time when the positioning of the motor 4 is completed, there is no or minimal influence of the delay of the time change pattern of the position error. Therefore, even if the fixer 35 stops fixing the detection threshold, detection of a false abnormality is eliminated or minimized. After this point of time, therefore, an abnormality is correctly detected.

In another possible embodiment, not illustrated, the fixer 35 may release the fixation of the detection threshold at the point of time when the position command velocity restarts increasing. The detection of a false abnormality caused by a delay of the time change pattern of the position error is less frequent while the position command velocity is on the increase. In view of this, the fixer 35 stops fixing the detection threshold at the point of time when the position command velocity restarts increasing. After this point of time, therefore, an abnormality is correctly detected.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" mean "approximately identical", "approximately same", "approximately equivalent", and "approximately different", respectively, with design-related and production-related tolerance and error taken into consideration.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A motor controller, comprising:
   memory; and
   processing circuitry configured to
      control a motor based on a position command and based on a position detection value corresponding to a detected position of the motor,
      calculate a tolerance position error in a successive manner based on the position command and based on a control parameter used to control the motor,
      calculate a position error maximum threshold that depends on the tolerance position error,
      detect an abnormality based on the position error maximum threshold, and
      trigger an indication when the abnormality is detected, wherein
   the processing circuitry is further configured to fix the position error maximum threshold at a predetermined timing, and stop fixing the position error maximum threshold at a point of time when a position command velocity that is rate of change in time of the position command restarts increasing.

2. The motor controller according to claim 1, wherein the processing circuitry is further configured to calculate the position error maximum threshold by adding a predetermined quantity to the tolerance position error in a direction of the position command velocity.

3. The motor controller according to claim 1, wherein the predetermined timing comprises a timing at which the position command velocity starts decreasing.

4. The motor controller according to claim 1, wherein the processing circuitry is further configured to fix the position error maximum threshold at a present value of the position error maximum threshold.

5. The motor controller according to claim 1, wherein the control parameter comprises at least one gain from among a position loop gain and a feedforward gain that are used in the control of the motor.

6. The motor controller according to claim 1, wherein the processing circuitry is further configured to detect the abnormality by comparing the position error maximum threshold with a position error that is a difference between the position command and the position detection value.

7. A method for controlling a motor, comprising:
controlling the motor based on a position command and based on a position detection value corresponding to a detected position of the motor;
calculating a tolerance position error in a successive manner based on the position command and based on a control parameter used in the controlling the motor;
calculating a position error maximum threshold that depends on the tolerance position error;
fixing the position error maximum threshold at a predetermined timing, and stopping fixing the position error maximum threshold at a point of time when a position command velocity that is a rate of change in time of the position command restarts increasing;
detecting an abnormality based on the position error maximum threshold; and
triggering an indication when the abnormality is detected.

8. The motor controller according to claim 3, wherein the processing circuitry is further configured to fix the position error maximum threshold at a present value of the position error maximum threshold.

9. The motor controller according to claim 2, wherein the control parameter comprises at least one gain from among a position loop gain and a feedforward gain that are used in the control of the motor.

10. The motor controller according to claim 4, wherein the control parameter comprises at least one gain from among a position loop gain and a feedforward gain that are used in the control of the motor.

11. The motor controller according to claim 3, wherein the control parameter comprises at least one gain from among a position loop gain and a feedforward gain that are used in the control of the motor.

12. The method according to claim 7, wherein the calculating calculates the position error maximum threshold by adding a predetermined quantity to the tolerance position error in a direction of the position command velocity.

13. The method according to claim 7, wherein the fixing fixes the position error maximum threshold at a present value of the position error maximum threshold.

14. The method according to claim 7, wherein the detecting detects the abnormality by comparing the position error maximum threshold with a position error that is a difference between the position command and the position detection value.

* * * * *